(12) United States Patent
Imai et al.

(10) Patent No.: US 7,369,939 B2
(45) Date of Patent: May 6, 2008

(54) METHOD AND APPARATUS FOR DISPLAYING INFORMATION FOR VEHICLE, AND COMPUTER PRODUCT

(75) Inventors: Kazushige Imai, Tokyo (JP); Isao Nomura, Tokyo (JP)

(73) Assignees: Pioneer Corporation, Tokyo (JP); Pioneer Design Corporation, Tokyo (JP)

( * ) Notice: Subject to any disclaimer, the term of this patent is extended or adjusted under 35 U.S.C. 154(b) by 144 days.

(21) Appl. No.: 11/171,370

(22) Filed: Jul. 1, 2005

(65) Prior Publication Data

US 2006/0004516 A1  Jan. 5, 2006

(30) Foreign Application Priority Data

Jul. 1, 2004  (JP) .............................. 2004-196007

(51) Int. Cl.
*G01C 21/00* (2006.01)
(52) U.S. Cl. ............ 701/211; 340/995.24; 340/995.27; 340/995.28; 382/104
(58) Field of Classification Search ................ 701/211; 345/7; 340/995.24, 995.27, 995.28; 382/104, 382/103, 199
See application file for complete search history.

(56) References Cited

U.S. PATENT DOCUMENTS

| | | | | |
|---|---|---|---|---|
| 5,555,312 A | * | 9/1996 | Shima et al. ................ | 382/104 |
| 5,864,632 A | * | 1/1999 | Ogawa et al. .............. | 382/113 |
| 5,941,922 A | * | 8/1999 | Price et al. ................... | 701/51 |
| 6,091,833 A | * | 7/2000 | Yasui et al. ................ | 382/104 |
| 6,906,620 B2 | * | 6/2005 | Nakai et al. ................ | 340/435 |
| 6,947,064 B1 | * | 9/2005 | Hahn et al. ................. | 701/301 |
| 6,977,630 B1 | * | 12/2005 | Donath et al. ................ | 345/7 |
| 7,004,838 B2 | * | 2/2006 | Hayashida et al. ........... | 463/31 |
| 7,167,779 B2 | * | 1/2007 | Kashiwada et al. ............ | 701/1 |
| 2002/0085043 A1 | * | 7/2002 | Ribak ......................... | 345/810 |
| 2005/0200463 A1 | * | 9/2005 | Situ et al. ................... | 340/438 |

* cited by examiner

*Primary Examiner*—Tuan C To
(74) *Attorney, Agent, or Firm*—Foley & Lardner LLP

(57) ABSTRACT

An apparatus for displaying information on a vehicle includes an information acquiring unit that acquires at least one of speed information and engine revolutions-per-minute information of the vehicle; and a display control unit that controls a display screen in such a manner that a road and a roadside zone of the road is displayed three-dimensionally, and a display of the road side zone is changed dynamically according to a speed and an engine revolutions-per-minute of the vehicle, based on the speed information and the engine revolutions-per-minute information of the vehicle acquired.

8 Claims, 6 Drawing Sheets

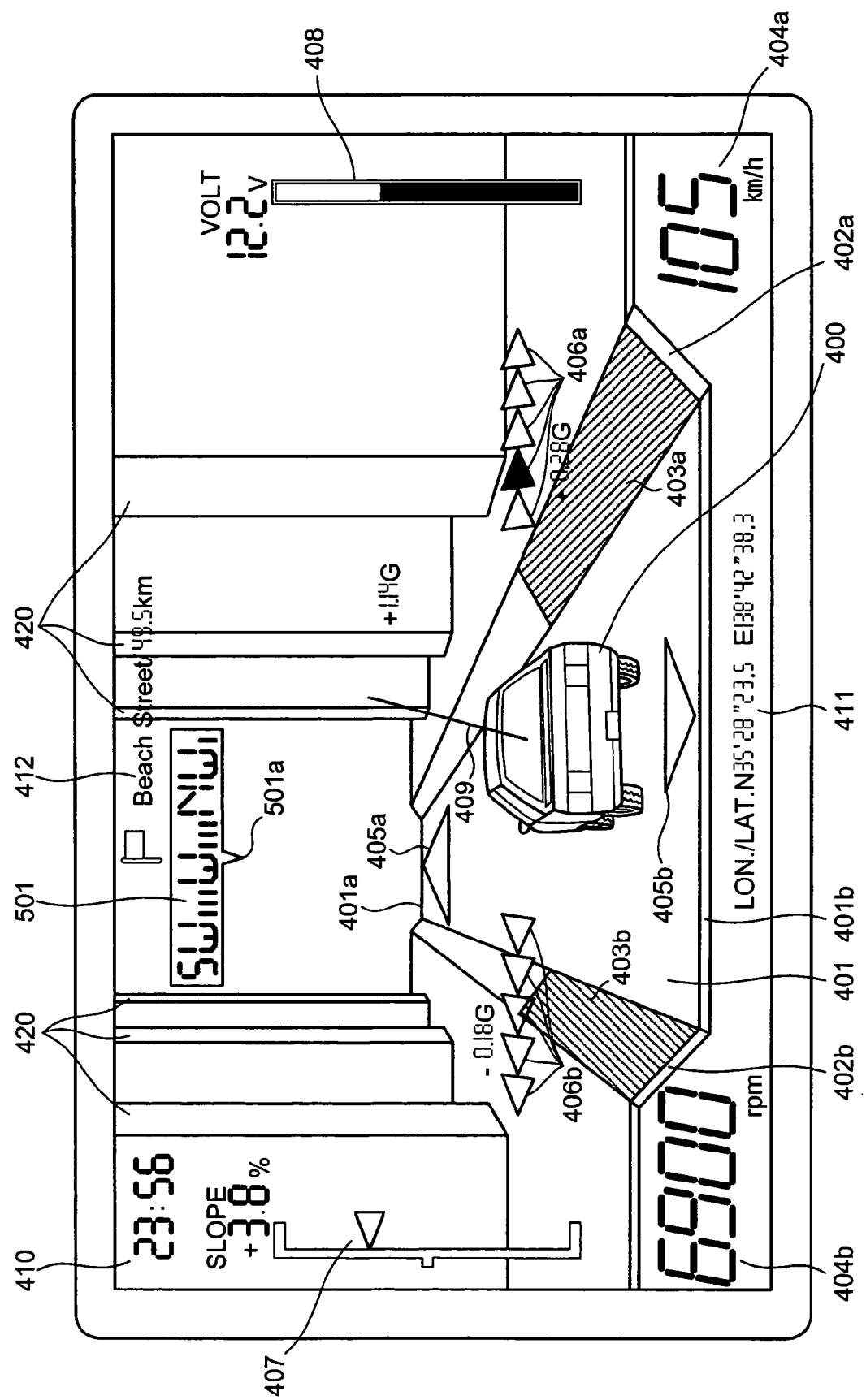

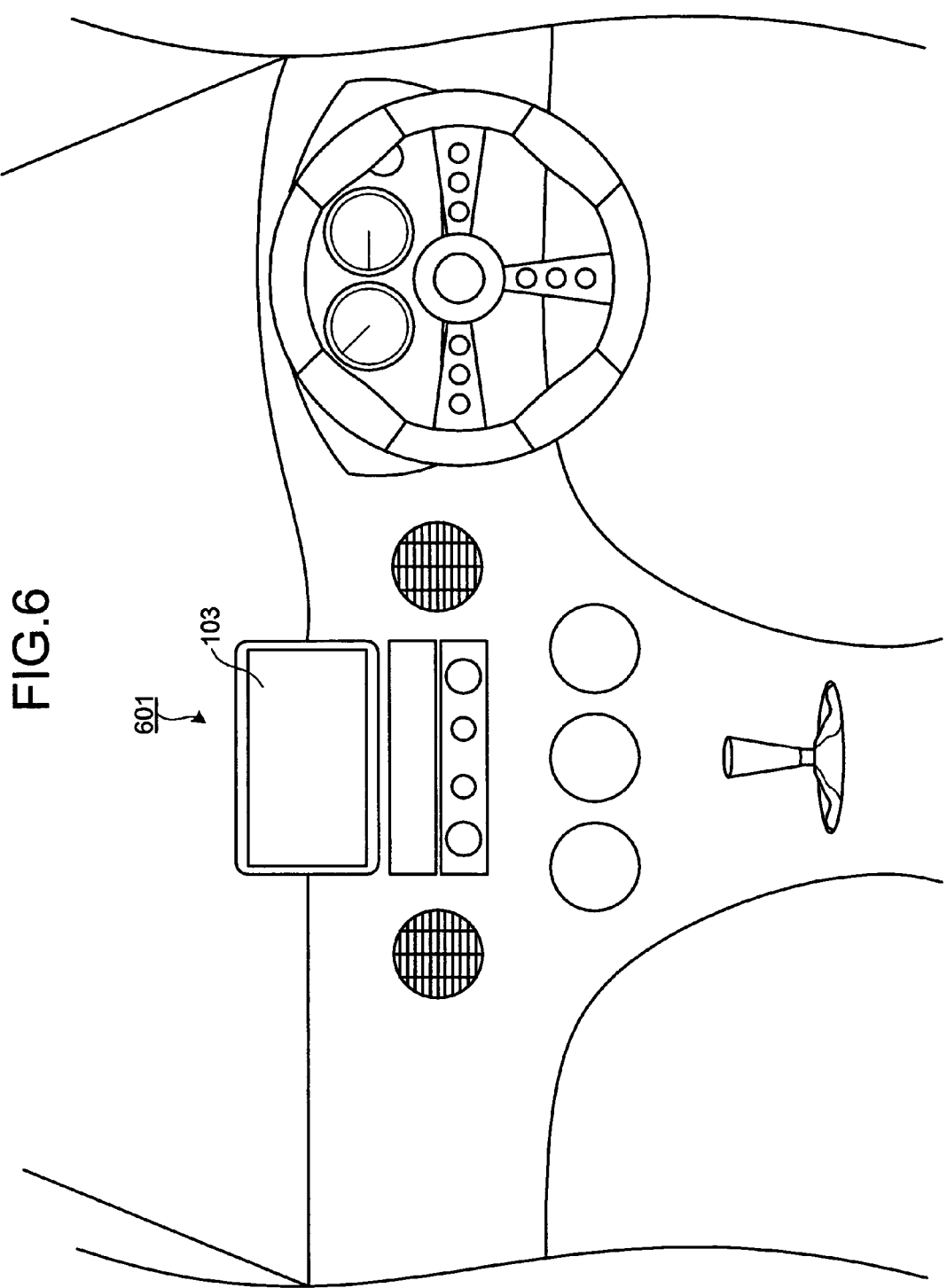

US 7,369,939 B2

METHOD AND APPARATUS FOR DISPLAYING INFORMATION FOR VEHICLE, AND COMPUTER PRODUCT

BACKGROUND OF THE INVENTION

1) Field of the Invention

The present invention relates to a technology for displaying various types of information on a vehicle effectively.

2) Description of the Related Art

Conventionally, display of speed information and engine revolutions-per-minute (RPM) information of a vehicle has been analog display using a circular display (meter) or digital display using numerals. The speed information and the engine RPM information of a vehicle have been displayed on separate displays (meters). In general, the displays have been set in front of a driver such that the driver can visually recognize the displays easily. In addition, a display screen for displaying map information has been provided in a in-vehicle navigation system separately from the displays.

However, when map information is not displayed on the display screen in a vehicle mounted with the in-vehicle navigation system, an animation image prepared in advance has to be displayed on the display screen or the display screen has to be turned off. Therefore, the display screen is not used effectively, leading to lack of entertainment for a driver and a passenger.

SUMMARY OF THE INVENTION

It is an object of the present invention to at least solve the above problems in the conventional technology.

An apparatus for displaying information on a vehicle according to one aspect of the present invention includes an information acquiring unit that acquires at least one of speed information and engine revolutions-per-minute information of the vehicle; and a display control unit that controls a display screen in such a manner that a road and a roadside zone of the road is displayed three-dimensionally, and a display of the road side zone is changed dynamically according to a speed and an engine revolutions-per-minute of the vehicle, based on the speed information and the engine revolutions-per-minute information of the vehicle acquired.

An apparatus for displaying information on a vehicle according to another aspect of the present invention includes an information acquiring unit that acquires at least one of slope information and lateral-gravity information of the vehicle; and a display control unit that controls a display screen in such a manner that a road is displayed three-dimensionally, and a display of the road is changed dynamically according to a slope of the road or a lateral gravity of the vehicle based on the slope information or the lateral-gravity information of the vehicle, respectively.

A method of displaying information on a vehicle according to still another aspect of the present invention includes acquiring at least one of speed information and engine revolutions-per-minute information of the vehicle; and controlling a display screen in such a manner that a road and a roadside zone of the road is displayed three-dimensionally, and a display of the road side zone is changed dynamically according to a speed and an engine revolutions-per-minute of the vehicle, based on the speed information and the engine revolutions-per-minute information of the vehicle acquired.

A method of displaying information on a vehicle according to still another aspect of the present invention includes acquiring at least one of slope information and lateral-gravity information of the vehicle; and controlling a display screen in such a manner that a road is displayed three-dimensionally, and a display of the road is changed dynamically according to a slope of the road or a lateral gravity of the vehicle based on the slope information or the lateral-gravity information of the vehicle, respectively.

A computer-readable recording medium according to still another aspect of the present invention stores a computer program that causes a computer to execute the above methods according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is a schematic for illustrating another example of the content displayed on the display screen of the information display apparatus according to the present embodiment; and FIG. 6 is a schematic for illustrating an example of implementation of the information display apparatus according to the present embodiment.

DETAILED DESCRIPTION

Exemplary embodiments of a method and an apparatus for displaying information for a vehicle, and a computer product according to the present invention are explained in detail below with reference to the accompanying drawings.

Figure 1:
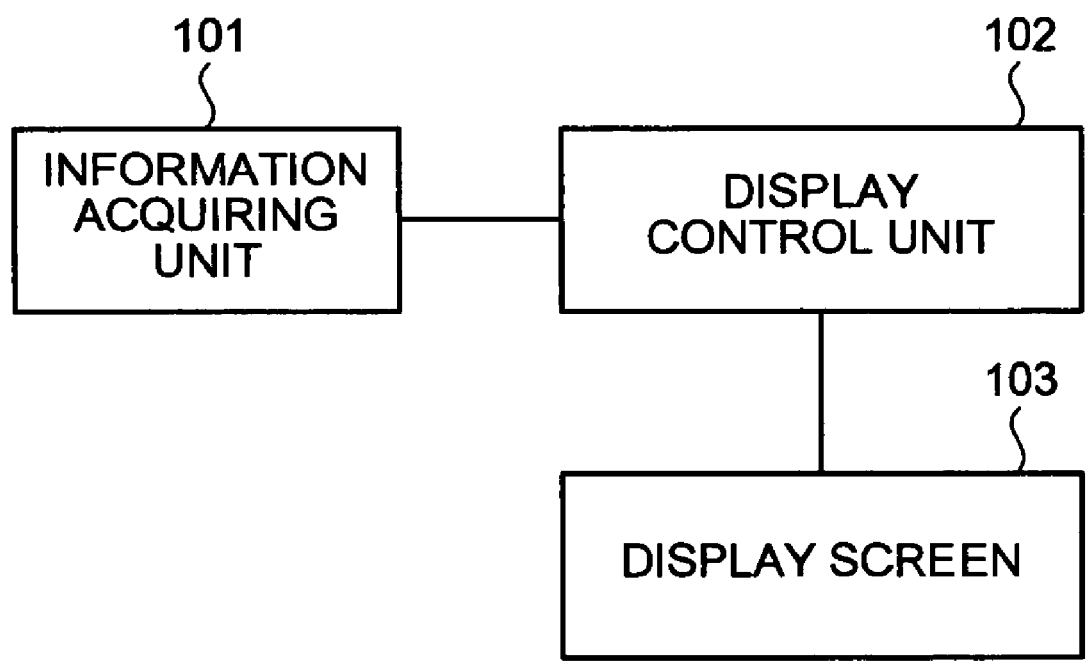
FIG. 1 is a block diagram for illustrating an example of a functional structure of an information display apparatus according to an embodiment of the present invention.

FIG. 1 is a block diagram for illustrating an example of a functional structure of an information display apparatus according to an embodiment of the present invention. The information display apparatus provided in a vehicle (including a four wheel car and a motorcycle) includes an information acquiring unit 101, a display control unit 102, and a display screen 103.

The information acquiring unit 101 acquires at least one of speed information and engine RPM information of the vehicle. In other words, the information acquiring unit 101 may acquire only the speed information of the vehicle, only the engine RPM information of the vehicle, or both the speed information and the engine RPM information of the vehicle. In addition, the information acquiring unit 101 acquires at least one of slope information and lateral gravity (G) information of the vehicle. In other words, the information acquiring unit 101 may acquire only the slope information of the vehicle, only the lateral G information of the vehicle, or both the slope information of the vehicle and the lateral G information of the vehicle.

Besides the information described above, the information acquiring unit 101 may acquire information on a state of the vehicle, for example, acceleration information, angular-velocity information, voltage information, direction information, time information, latitude and longitude information, torque information, and horse power information.

The display control unit 102 controls one display screen 103 to display a road and roadside zones of the road to be seen three-dimensionally. Then, the display control unit 102 displays the roadside zones such that the display is changed dynamically according to speed or engine RPM of the vehicle based on the speed information or the engine RPM information of the vehicle. In this way, the display control unit 102 can display the speed information of the vehicle, which is one of most important kinds of information at the traveling time, and the engine RPM of the vehicle related to the speed information on an identical screen simultaneously. Thus, a driver and a passenger can visually recognize both the kinds of information simultaneously and check a relation of the speed information and the engine RPM information of the vehicle without moving a line of sight and without performing special operation.

Specifically, the information acquiring unit 101 acquires both the speed information and the engine RPM information of the vehicle. The display control unit 102 displays the speed information and the engine RPM information, which are acquired by the information acquiring unit 101, simultaneously.

More specifically, the display control unit 102 displays the speed information acquired by the information acquiring unit 101 in one of the left and the right roadside zones and displays the engine RPM acquired by the information acquiring unit 101 in the other roadside zone. In other words, when the speed information is displayed in the right roadside zone, the engine RPM information is displayed in the left roadside zone and, when the speed information is displayed in the left roadside zone, the engine RPM information is displayed in the right roadside zone.

In the roadside zones, for example, a color of slopes is changed to a predetermined color to show portions of the predetermined color (so-called "roadside zone bars") as if the portions expand and contract. When the roadside zone bars look as if the roadside zone bars expand to a distance, it is indicated that the speed or the engine RPM of the vehicle increases. Conversely, when it looks as if the roadside zone bars contract, it is indicated that the speed or the engine RPM of the vehicle decreases.

The display control unit 102 displays the roadside zones such that it looks as if the roadside zones have slopes inclined at a predetermined angle. The display control unit 102 changes display on the slopes dynamically. Consequently, even if the roadside zone bars expand to a distance, a driver and a passenger can easily check the roadside zone bars. In addition, it is possible to represent small motions of the vehicle corresponding to the speed or the engine RPM of the vehicle.

The display control unit 102 controls the one display screen 103 to display a road to be seen three-dimensionally. Then, the display control unit 102 displays the road such that the display is changed dynamically according to inclination based on slope information of a vehicle. Specifically, for example, when the inclination is positive (i.e., the road is an uphill road), the display control unit 102 adds inclination to the road displayed on the display screen 103 and displays the road to be seen as an uphill road. Conversely, when the inclination is negative (i.e., the road is a downhill road), the display control unit 102 adds inclination to the road displayed on the display screen 103 to display the road to be seen as a downhill road. In this way, a driver and a passenger can recognize inclination, which cannot be recognized clearly from the inside of a traveling vehicle, intuitively through the display screen 103.

The display control unit 102 controls the one display screen 103 to display a road to be seen three-dimensionally. Then, the display control unit 102 displays the road such that the display is changed dynamically according to lateral G based on lateral gravitational information of the vehicle. Specifically, for example, when lateral G is caused on the left side of the vehicle, the display control unit 102 judges that the vehicle is turning to the right and displays the road to curve to the right. Conversely, when lateral G is caused on the right side of the vehicle, the display control unit 102 judges that the vehicle is turning to the left and displays the road to curve to the left. Then, the display control unit 102 determines left and right direction amounts according to an amount of lateral gravity. Therefore, when lateral G is caused neither on the left nor on the right, the display control unit 102 judges that the vehicle is moving straight forward and displays the road to extend in the forward direction (curves neither to the left nor to the right).

As described above, according to the present embodiment, a display screen is used effectively when map information is not displayed. This allows a driver and a passenger to check the speed information and the engine RPM information, which are necessary for traveling, without securing a special display area while improving entertainment for the driver and the passenger. This also allows the driver and the passenger to grasp a relation between speed and engine RPM or other kinds of state information during traveling at a first glance.

The display control unit 102 displays an image, which shows a vehicle on a road, on the display screen 103. In addition, the display control unit 102 displays a background shown beside the road, which is displayed on the display screen 103, as if the background flows from the front to the rear. In other words, the display control unit 102 displays a building to appear from the front side of the road, move to the rear along the road, and disappear when the building moves to a side closest to a driver. This makes it possible to show the vehicle displayed on the display screen 103 as if the vehicle is traveling on the road.

The information acquiring unit 101 acquires speed information of the vehicle and the display control unit 102 changes speed for moving the background based on the speed information acquired by the information acquiring unit 103. This makes it possible to, for example, stop the movement of the background when the vehicle stops and increase moving speed of the background as the speed of the vehicle increases. As a result, the driver and the passenger can acquire a sense of speed through the display screen 103.

The display screen 103 may be a dedicated display screen or may be a display screen of the in-vehicle navigation system. If the display screen of the in-vehicle navigation system is used as the display screen 103, the display screen 103 does not have to be mounted separately in the vehicle having the in-vehicle navigation system. In addition, not only a driver but also a passenger on a passenger seat can check a content of display easily. Thus, the passenger can navigate easily.

Therefore, it is possible to improve entertainment using the in-vehicle navigation system when a navigation function thereof is not used. In other words, the in-vehicle navigation system displays speed information and engine RPM information of a traveling vehicle simultaneously in stead of displaying map information. This allows a driver and a passenger to enjoy a drive more.

Figure 2:
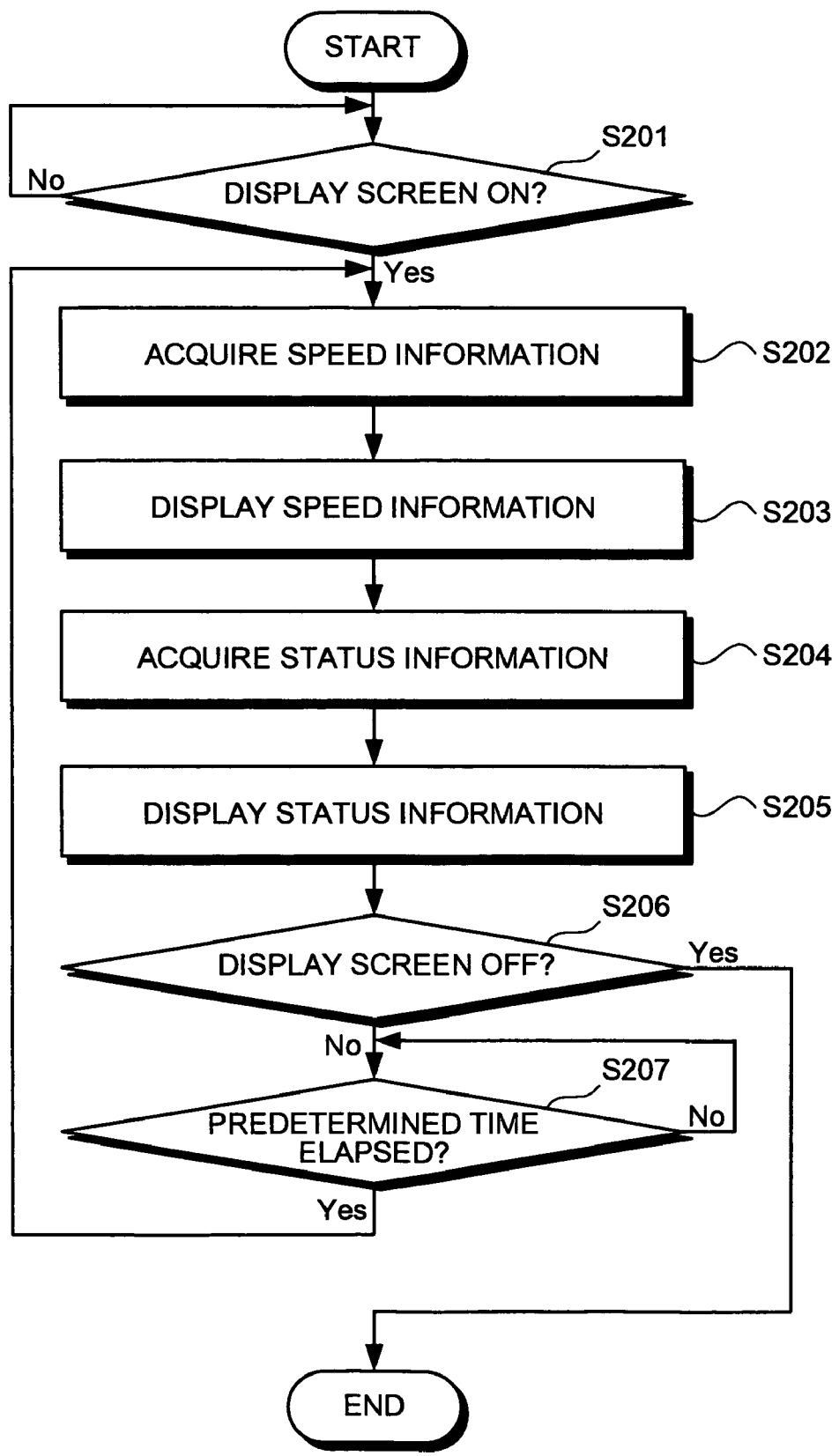
FIG. 2 is a flowchart of a processing performed by the information display apparatus according to the present embodiment.

FIG. 2 is a flowchart of a processing performed by the information display apparatus according to the present embodiment. The information display apparatus judges whether the display screen 103 is ON (step S201). When the display screen 103 is ON ("Yes" at step S201), the information display apparatus acquires speed information of a vehicle (step S202) and displays the acquired speed information in a predetermined area of the display screen 103 (step S203). In addition, the information display apparatus acquires state information such as engine RPM information, slope information, and lateral G information of the vehicle (step S204) and, as described above, displays the acquired state information in a predetermined area of the display screen 103 according to a display method decided in advance (step S205).

Next, the information display apparatus judges whether the display screen 103 is turned OFF (step S206). If the display screen 103 is not turned OFF ("No" at step S206), the information display apparatus judges whether a predetermined time (e.g., several milliseconds) has elapsed (step S207). If the predetermined time has elapsed ("Yes" at step S207), the information display apparatus returns to step S202 and repeats the acquisition and display of speed information and state information.

Through such processing, the information display apparatus can display speed information and state information such as engine RPM information, slope information, and lateral G information, which change every moment, on the display screen 103. If the display screen 103 is turned OFF at step S206 ("Yes" at step S206), the information display apparatus ends the series of processing.

Figure 3:
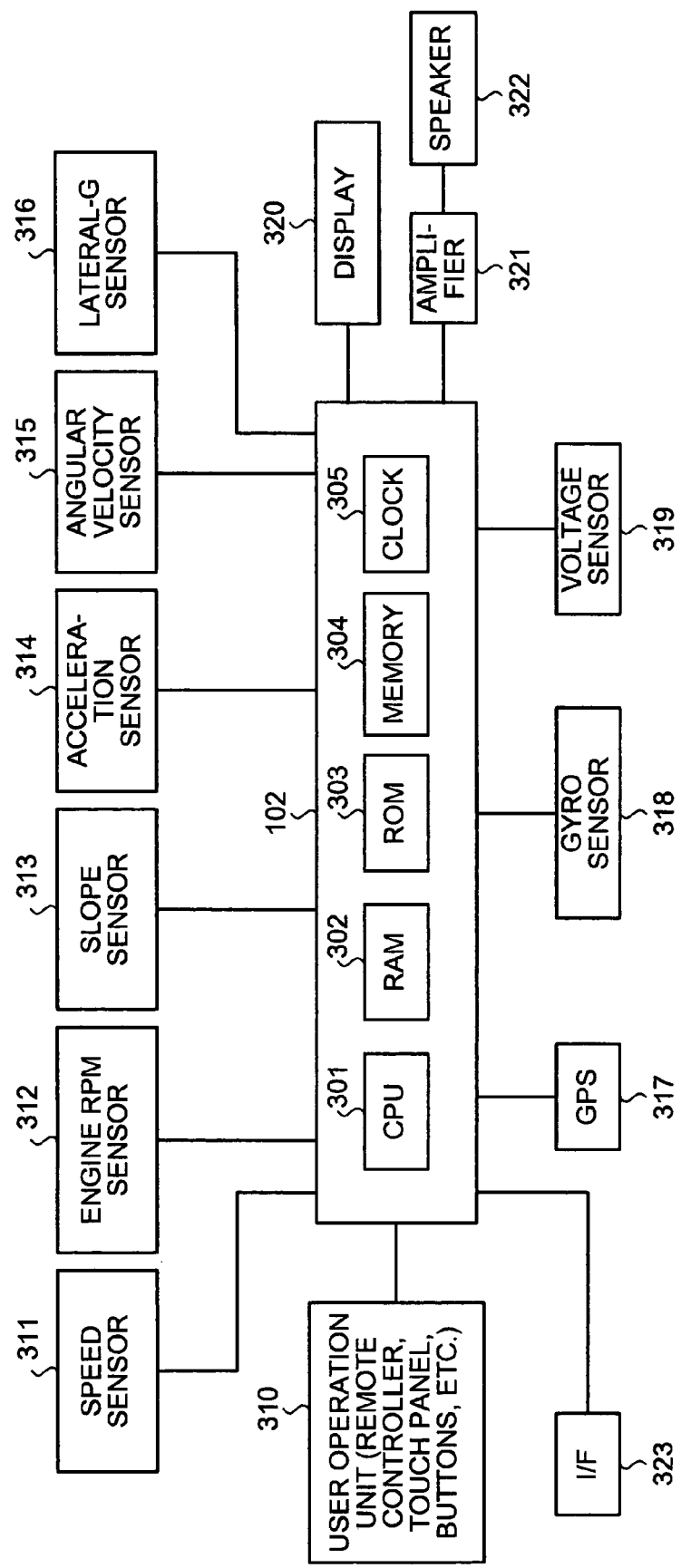
FIG. 3 is a block diagram for illustrating an example of a hardware constitution of the information display apparatus according to the present embodiment.

FIG. 3 is a block diagram for illustrating an example of a hardware constitution of the information display apparatus according to the present embodiment. The information display apparatus includes a central processing unit (CPU) 301 functioning as the display control unit 102, a random access memory (RAM) 302, a read only memory (ROM) 303, a memory 304, and a clock 305. A user operation unit 310, a speed sensor 311 that detects speed of a traveling vehicle, an engine RPM sensor 312 that detects an engine RPM of the vehicle, a slope sensor 313 that detects a slope of the vehicle, an acceleration sensor 314 that detects acceleration of the vehicle, an angular velocity sensor 315 that detects angular velocity of the vehicle during cornering, and a lateral G sensor 316 that detects lateral gravity, that is an outward force (gravity) caused by a centrifugal force, are connected to the display control unit 102.

In addition, a global positioning system (GPS) 317 that detects a position (latitude and longitude information) of a vehicle by receiving radio waves from an artificial satellite, a gyro sensor 318 that detects a traveling direction of the vehicle, and the voltage sensor 319 for an electric system of the vehicle are connected to the display control unit 102. The sensors 311 to 319 realize the functions of the information acquiring unit 101. A display 320 functioning as the display screen 103, an amplifier 321, and a speaker 322 are also connected to the display control unit 102.

Although not shown in the figure, the information display apparatus may include sensors that detect torque (torque is a force for rotating a shaft) information and horse power (horse power is numerical representation of work done by a horse) information.

The CPU 301 performs display control and also controls the entire information display apparatus. The RAM 302 is used as a work area of the CPU 301. The ROM 303 stores a basic processing program for the information display apparatus. The memory 304 stores various kinds of information. Specifically, for example, the memory 304 is a hard disk (HD). Alternatively, the memory 304 may be a detachable recording medium like a digital versatile disk (DVD) or a compact disk (CD). The clock 305 counts and stores information on the present time.

A function of the user operation unit 310 is realized by a touch panel, a remote controller, buttons provided in the information display apparatus, or the like. Specifically, the display 320 includes a liquid crystal display or an organic electroluminescence (EL) display. A communication interface (I/F) 323 performs data communication with a communication device on the outside by radio.

Although not shown in the figure, the information display apparatus may include a map database (DB), a navigation control unit, a position recognizing unit, a guide sound output unit, a point searching unit, a route acquiring unit, a route guiding unit, and a guide sound generating unit that are provided in a general in-vehicle navigation system.

The navigation control unit informs the display 320 which location on a map a vehicle is traveling based on own vehicle location information calculated by the position recognizing unit and the map DB.

The guide sound output unit controls output to one or plural speakers 322 using the amplifier 321 to thereby reproduce a guide sound.

The point searching unit searches for an arbitrary point based on information inputted from the user operation unit 310 and outputs the point to the display 320. The route acquiring unit calculates an optimum route to the point based on point information obtained by the point searching unit. The route guiding unit generates route guidance information on a real time basis based on information obtained by the route acquiring unit and the own vehicle location information.

The guide sound generating unit generates data of a tone and a sound corresponding to a pattern. In other words, the guide sound generating unit sets a virtual sound source corresponding to a guide point and generates sound guidance information based on route information and outputs the sound guidance information to the guide sound output unit.

Figure 4:
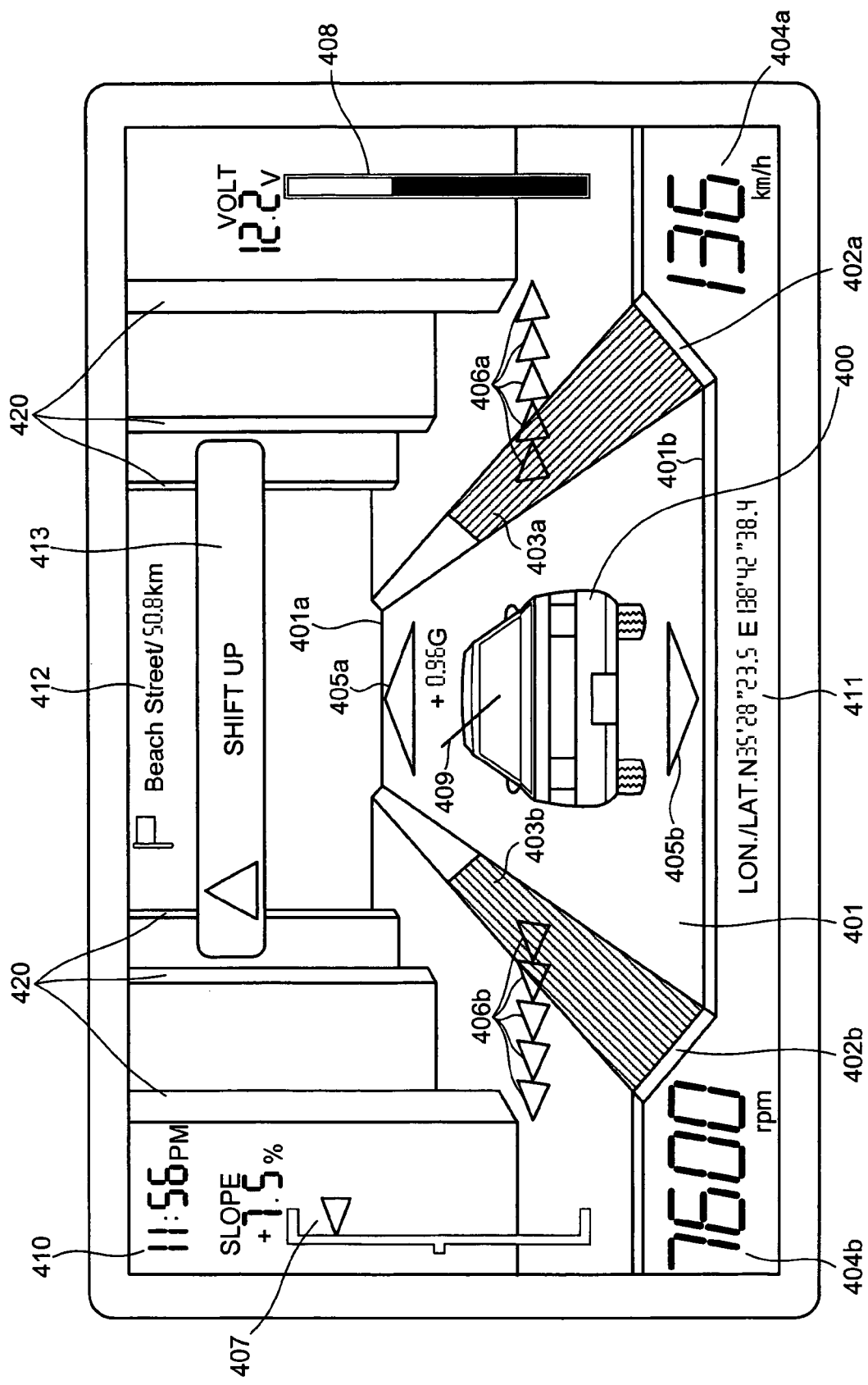
FIG. 4 is a schematic for illustrating an example of a content displayed on a display screen of the information display apparatus according to the present embodiment.

FIGS. 4 and 5 are schematics for illustrating contents displayed on a display screen of the information display apparatus according to the present embodiment. In the display screen (a display) shown in FIG. 4, reference numeral 400 denotes a vehicle and 401 denotes a road displayed so as to be seen as if the road extends in the forward direction. The vehicle 400 is displayed as if the vehicle 400 is traveling on the road 401. The road 401 is displayed to be narrowed further in a forward portion thereof such that it looks as if the road 401 extends in the forward direction.

Note that a method of displaying the road 401 is not limited to this. The road 401 may be displayed as if the vehicle 400 is traveling from the left side to the right side or from the right side to the left side of the display screen. It is also possible to change a model, a color, and the like of the vehicle 400 on the road 401 according to operation of a driver or a passenger.

In that case, a model, a color, and the like, which are the same as those of a vehicle mounted with the apparatus, may be reproduced. Vehicle information on the display screen is stored in the RAM 302 or the ROM 303 shown in FIG. 3. It is also possible not to display only the vehicle 400 according to operation of the driver or the passenger. In that case, scenery modeled after scenery, which the driver or the passenger can actually see from a windshield, may be displayed on the display screen 103.

A roadside zone 402a (on the right side) and a roadside zone 402b (on the left side), which have a predetermined angle, are provided on both sides of the road 401. Roadside zone bars 403a and 403b are displayed on slopes of the roadside bands 402a and 402b. Plural buildings 420 are displayed on both sides of the roadside zones 402a and 402b. The buildings 420 are displayed to be moved from a forward side to a front side along the road 401. The buildings 420 may be imaginary buildings prepared in advance or may be actual buildings acquired from the map information.

Reference sign 404a denotes a speed information display area (on the right side) provided by the roadside zone 402a having the predetermined angle. In FIG. 4, present speed "136 km/h" is displayed in the speed information display area 404a. Reference sign 404b denotes an engine-RPM-information display area (on the left side) provided by the roadside zone 402b having the predetermined angle. In FIG. 4, present engine RPM "7600 rpm" is displayed in the engine-RPM-information display area 404b.

On the other hand, in FIG. 5, present speed "105 km/h" is displayed in the speed information display area 404a. The roadside zone bar 403a is displayed to be shorter than that in FIG. 4 according to the speed. Present engine RPM "6900 rpm" is displayed in the engine-RPM-information display area 404b. The roadside zone bar 403b is displayed to be shorter than that in FIG. 4 according to the engine RPM.

A color of the roadside zone bar 403a is changed when speed of the vehicle 400 is equal to or higher than predetermined speed. For example, when speed of the vehicle 400 exceeds speed limit or reaches critical speed, a color of only a portion from a predetermined position to a top end portion of the roadside zone bar 403a may be changed (e.g., the roadside zone bar 403a is usually displayed in blue and the portion from the predetermined position to the top end portion is displayed in red). Alternatively, a color of the entire roadside zone bar 403a may be changed (e.g., the entire roadside zone bar 403a is usually displayed in blue and, when the speed of the vehicle 400 exceeds the predetermined speed, a length of the roadside zone bar 403a is increased and the entire roadside zone bar 403a is displayed in red). Consequently, the driver and the passenger can recognize the change of colors to sensibly grasp that the speed of the vehicle 400 has exceeded the predetermined speed.

A color of the roadside zone bar 403b is also changed when engine RPM of the vehicle 400 is equal to or higher than predetermined engine RPM. Consequently, in particular, in a manual transmission car, at an instance when a color of the roadside zone bar 403b, a driver can change gear changes to thereby prevent over revolution.

Reference sign 405a denotes an acceleration information display mark (on an acceleration side) and 405b denotes an acceleration information display mark (on a deceleration side). A color of one of the acceleration information display marks 405a and 405b changes. When a color of the acceleration information display mark 405a, which is displayed to be seen in front of the vehicle 400, changes, this indicates a state in which the vehicle 400 is accelerating. Conversely, when a color of the acceleration information display mark 405b, which is displayed to be seen in the rear of the vehicle 400, changes, this indicates a state in which the vehicle 400 is decelerating. A degree of acceleration (or deceleration) may be indicated by a changing color. For example, concentration of a red color may be increased as the degree of acceleration increases.

A size or a shape of the acceleration information display mark 405a or 405b may be changed instead of a color according to the degree of acceleration (or deceleration). For example, a size of the acceleration information display mark 405a may be increased or an angle of a vertex of a triangle of the acceleration information display mark 405a is reduced to be an acute angle as the degree of acceleration increases.

Reference numeral 406a denotes lateral G information display marks (on the right side) and 406b denotes lateral G information display marks (on the left side). A color or the like of the lateral G information display marks 406a and 406b is changed according to an amount of lateral gravity. For example, when the lateral G is small, a color or the like of marks on the inner side is changed and, as the lateral G increases, a color or the like of marks on the outer side is changed. When the amount of the lateral G reaches a maximum amount set in advance, a color or the like of a mark on the outermost side is changed. Therefore, when the vehicle is moving straight forward and no lateral G is applied to the vehicle, a color or the like is not changed in all the marks.

In FIG. 4, since the vehicle 400 is moving straight forward, no lateral G is applied to the vehicle 400 and colors of all the marks are not changed. In FIG. 5, since the vehicle 400 is turning to the left, lateral G is applied on the right side and only a color of a second mark from the inner side is changed. When lateral G is applied to the vehicle 400, an amount of the lateral G may be displayed numerically near a mark ('+0.28G' in FIG. 5).

Reference numeral 407 denotes a slope-information display area (SLOPE), in which a level meter is displayed to indicate an amount of inclination at the present point. The amount of inclination may be displayed numerically near the level meter ('+7.5%' in FIG. 4 and '+3.8%' in FIG. 5). A way of showing inclination of the road 401 is also changed according to the amount of inclination. When the road 401 in FIG. 4 and the road 401 in FIG. 5 are compared, the road 401 in FIG. 4 having a larger amount of inclination ('+7.5%') is displayed to be inclined larger than the road 401 in FIG. 5 ('+3.8%').

The road 401 in FIG. 4 is displayed such that a position (height) on a screen of a top end portion 401a in the forward direction of the road 401 in FIG. 4 is higher than a position (height) on a screen of the top end portion 401a in the forward direction of the road 401 in FIG. 5 (in other words, a width between a base point portion 401b, which is a base point of the road 401, and the top end portion 401a is increased).

Consequently, since it looks as if the vehicle 400 on the screen ascends a slope, the driver and the passenger can learn an amount of inclination more sensibly. Conversely, when an amount of inclination is negative, it is possible to show as if the vehicle 400 on the screen descends a slope by decreasing the width between the top end portion 401a and the base point portion 401b.

Reference numeral 408 denotes a voltage information display area (VOLT), in which a level meter is displayed to indicate a voltage at the present point. The VOLT 408 changes to an upper side as a voltage increases and changes to a lower side as a voltage decreases. A voltage is indicated by digital display together with analog display in the VOLT 408. For example, '12.2 (V)' may be displayed near the VOLT 408.

Reference numeral 409 denotes a destination direction information display bar. This destination direction information display bar 409 indicates a direction in which a set destination is present viewed from a present location. In FIG. 4, a destination is in a left forward direction with respect to a present traveling direction. In FIG. 5, a destination is in a right forward direction with respect to a present traveling direction.

Reference numeral 410 denotes a time information display area. In FIG. 4, present time '11.56 (PM)' is indicated by digital display. The time may be indicated by analog display using an analog clock. In addition, time may be indicated by the 24-hour display. FIG. 5 shows a state in which time of the time information display area 410 is indicated by the 24-hour display ('23:56').

Reference numeral 411 denotes a latitude and longitude information display area. In FIG. 4, a present position 'N35'28"23.5' 'E138'42"38.4' acquired from a GPS is indicated by digital display.

Reference numeral 412 denotes a destination information display area. In FIG. 4, a location of a destination set in advance ('Beach Street') and a distance to the destination ('50.8 km') are indicated. A flag displayed at the left end is a mark for indicating that a displayed location is a destination. This mark is displayed to prevent 'Beach Street' from being recognized as a present location by mistake.

Reference numeral 413 denotes a warning information display area, in which various kinds of warning information to be communicated to the driver and the passenger are displayed. In FIG. 4, 'SHIFT UP' is displayed in the warning information display area 413 to warn the driver to shift a gear up. As other kinds of warning information, there are 'SHIFT DOWN', 'SPEED DOWN', and the like. The warning information display area 413 is erased after being displayed for a predetermined time. The driver can set this predetermined time arbitrarily.

Reference numeral 501 in FIG. 5 denotes a direction information display area, in which information on a present traveling direction is displayed. Display of initial letters indicating directions moves to the left and right to change. Then, an initial letter pointed by a pointing section 501a in the center of the direction information display area 501 or a scale between initial letters indicates the present traveling direction. In FIG. 5, it is seen that the vehicle 400 is traveling in a direction slightly to the north from due west ('W'). When the warning information display area 413 is displayed, the direction information display area 501 is not displayed because the direction information display area 501 is hidden behind the warning information display area 413.

EXAMPLE OF IMPLEMENTATION OF THE INFORMATION DISPLAY APPARATUS

FIG. 6 is a schematic for illustrating an example of implementation of the information display apparatus according to the present embodiment. As shown in FIG. 6, a in-vehicle navigation system 601 is mounted between a driver seat and a passenger seat in a vehicle. A display of the in-vehicle navigation system 601 may be a display of an on-dashboard system or an in-dashboard system.

The display screen 103 may be a display screen of the in-vehicle navigation system 601. When the display screen of the in-vehicle navigation system 601 is used as the display screen 103, the display screen 103 does not have to be amounted in a vehicle provided with the in-vehicle navigation system 601. In addition, not only a driver but also a passenger in the passenger seat can check a content of display easily. Thus, the passenger can navigate easily.

In this way, map information is not required in the in-vehicle navigation system. Therefore, even if map information is not used or even in a region where map information is not provided, it is possible to improve entertainment using the in-vehicle navigation system when the navigation function is not used.

The in-vehicle navigation system may has a radio communication function for communicating with other vehicles, in particular, other vehicles traveling before and behind the vehicle (e.g., information may be acquired by communication using a cellular phone or through the Internet using radio) to display information on display screens of in-vehicle navigation systems of the other vehicles. Consequently, drivers and passengers of the other vehicles can learn speed information, engine RPM information, inclination information, lateral G information, and the like of the vehicle easily.

The information display method according to the present embodiment may be a computer readable program prepared in advance and is realized by executing the program with a computer like a personal computer or a workstation including a server. This program is recorded in a computer readable recording medium like a hard disk (HD), a floppy disk (FD), a compact disk ROM (CD-ROM), a magneto-optical disk (MO), or a digital versatile disk (DVD) and read out from the recording medium by the computer to be executed. This program may be recorded in a transmission medium deliverable via a network such as the Internet.

As explained above, according to the example of the present invention, it is possible to acquire information on a traveling vehicle easily. In addition, it is possible to improve entertainment during traveling using the display screen 103.

The present document incorporates by reference the entire contents of Japanese priority document, 2004-196007 filed in Japan on Jul. 1, 2004.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for displaying information on a vehicle, the apparatus comprising:
   an information acquiring unit configured to acquire speed information and engine revolutions-per-minute information of the vehicle; and
   a display control unit configured to control a display screen in such a manner that:
      a road and a roadside zone of the road are displayed three-dimensionally;
      a display of the road side zone is changed dynamically according to a speed and an engine revolutions-per-minute of the vehicle based on the speed information and the engine revolutions-per-minute information of the vehicle; and
      the speed information is displayed on one side by the roadside zone, and the engine revolutions-per-minute information is displayed on another side by the roadside zone.

2. The apparatus according to claim 1, wherein the display control unit is configured to control the display screen to display the roadside zone in such a manner that the roadside zone looks like having a slope inclined at a predetermined angle, and a display on the slope is changed dynamically.

3. The apparatus according to claim 1, wherein the display control unit is configured to control the display screen in such a manner that an image of the vehicle is displayed on the road, and a background shown beside the road moves as if the background flows from a forward direction to a rear direction.

4. The apparatus according to claim 3, wherein the display control unit is configured to control the display screen in such a manner that a speed of movement of the background is changed based on the speed information acquired.

5. The apparatus according to claim 1, wherein:
the information acquiring unit is configured to acquire at least one of slope information and lateral-gravity information of the vehicle; and
the display control unit is configured to control the display screen in such a manner that a display of the road is changed dynamically according to a slope of the road or a lateral gravity of the vehicle based on the slope information or the lateral-gravity information of the vehicle.

6. The apparatus according to claim 1, wherein:
the display control unit is configured to control the display screen in such a manner that a bar is displayed on the roadside zone, and a length of the bar changes dynamically according to the speed and the engine revolutions-per-minute of the vehicle.

7. The apparatus according to claim 1, wherein:
the display control unit is configured to control the display screen in such a manner that a bar is displayed on the roadside zone, and a color of the bar changes dynamically according to the speed and the engine revolutions-per-minute of the vehicle.

8. An apparatus for displaying information on a vehicle, the apparatus comprising:
an information acquiring unit configured to acquire at least one of speed information and engine revolutions-per-minute information of the vehicle; and
a display control unit configured to control a display screen in such a manner that:
a road and a roadside zone of the road are displayed three-dimensionally;
the roadside zone is a slope inclined at a predetermined angle toward the road; and
a display on the slope is changed dynamically according to a speed or an engine revolutions-per-minute of the vehicle based on the speed information or the engine revolutions-per-minute information of the vehicle.

* * * * *